United States Patent [19]
Bowers

[11] 3,717,153
[45] Feb. 20, 1973

[54] STANDBY EXTERNAL RATE CONTROL AND IMPLANTED STANDBY HEART PACER

[75] Inventor: David L. Bowers, Milwaukee County, Wis.

[73] Assignee: General Electric Company

[22] Filed: Oct. 19, 1970

[21] Appl. No.: 81,846

[52] U.S. Cl. .............................. 128/419 P, 128/422
[51] Int. Cl. ............................................. A61n 1/36
[58] Field of Search ................... 128/419 P, 421, 422

[56] References Cited

UNITED STATES PATENTS

| | | | |
|---|---|---|---|
| 3,528,428 | 9/1970 | Berkevits | 128/419 P |
| 3,426,748 | 2/1969 | Bowers | 128/419 P |
| 3,241,556 | 3/1966 | Zacovto | 128/419 P |

OTHER PUBLICATIONS

Holcomb et al. "Medical & Biological Engineering," Vol. 7, No. 5, September, 1969, pp. 493–499

Primary Examiner—William E. Kamm
Attorney—Frank L. Neuhauser, Oscar B. Waddell, Joseph B. Forman, Jon Carl Gealow and Arthur V. Puccini

[57] ABSTRACT

The pacing pulse rate of a body implanted standby heart pacer is selectively controlled with a remote rate control device. The pacer has a coil which transmits a signal to the device whenever a natural heartbeat occurs or when an artificial stimulus is delivered to the heart. The same coil receives signals from the remote control device, and, if these signals are faster than the set rate of the pacer, the remote rate control will establish the rate of the pacer. The pacer paces the heart, when it requires artificial stimulation, at whatever rate the remote control is set. Signals radiated from the pacer are sensed by the remote rate control and are used to inhibit the remote transmitter for a specific period after each natural beat so there can be no competition between natural and artificial heart stimuli.

9 Claims, 5 Drawing Figures

INVENTOR,
DAVID L. BOWERS
Attorney

INVENTOR,
DAVID L. BOWERS

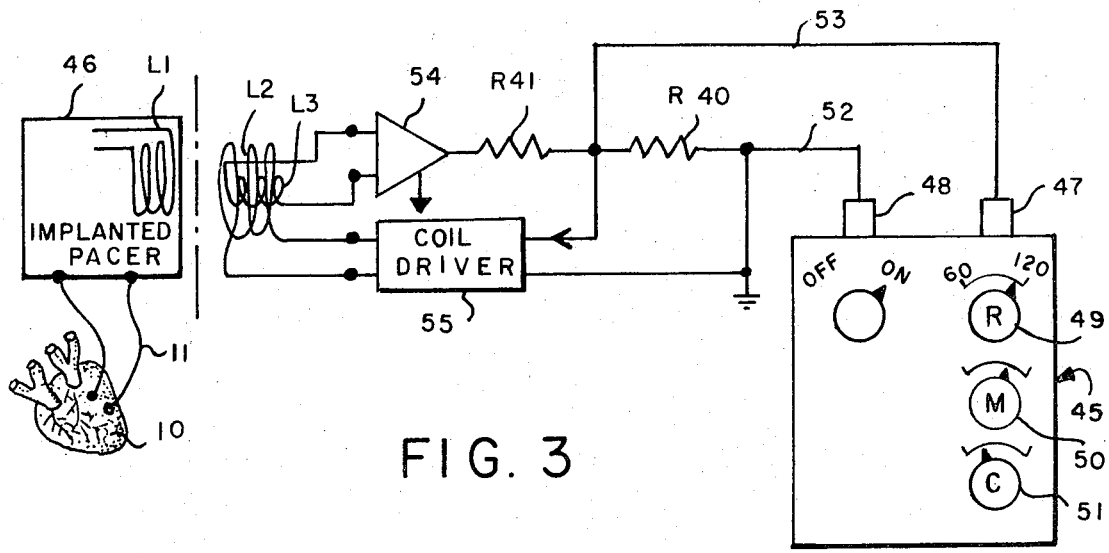
FIG. 3
FIG. 4
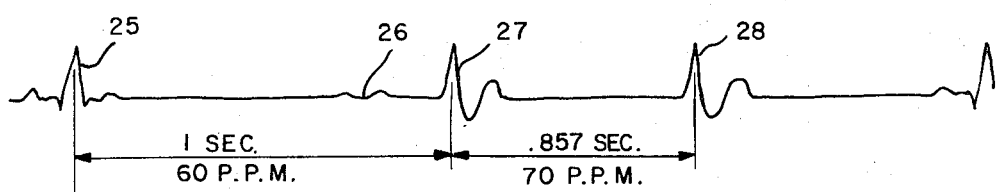
FIG. 5
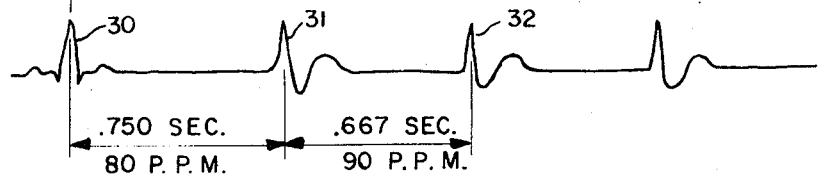
INVENTOR,
DAVID L. BOWERS

STANDBY EXTERNAL RATE CONTROL AND IMPLANTED STANDBY HEART PACER

BACKGROUND OF THE INVENTION

Implantable electronic heart pacers have been used in patients whose hearts have defective conduction systems. The first pacer designs delivered artificial stimulating pulses to the heart at a fixed rate. Sometimes there was competition with the natural heart stimuli which occasionally reappear in some patients. The demand type pacer was then developed. This type of pacer delivered one or more stimulating pulses to the heart only if a natural pulse was missed or delayed for a physiologically unacceptable period of time. A disadvantage of the demand type pacer is that it never lets the heart rate decline below the set minimum rate of the pacer. The chosen rate was usually high enough to allow the heart to fulfill metabolic demands incidental to fairly vigorous physical activity. The same rate was usually too high for a patient who desired to rest or sleep.

Standby pacers were then developed to overcome the above disadvantages. This type of pacer is similar to the demand type in respect to its supplying an artificial stimulating pulse if the natural stimulating pulse of the heart is missed or unduly delayed. However, the standby pacer has hysteresis which means that it permits the heart rate to drop through a range which corresponds with low physical activity before any artificial pace pulse is supplied. When the heart rate drops below a predetermined minimum, the standby pacer supplies one or more stimulating pulses as required at a higher rate which is commensurate with fairly vigorous physical activity.

Sometimes during the course of managing patients with implanted pacers physicians desire to elevate the heart rate above the intrinsic rate of the implanted pacer regardless of whether it is a fixed rate, demand or standby type. For instance, a high heart rate is often desired when the patient is convalescing from other illnesses and when heart function tests are being performed.

Early in the history of pacer development, one type of fixed rate pacer was adapted for having its intrinsic pace pulse rate increased by means of a control device which was located outside of the body. The implanted pacer included a coil in which a voltage could be induced by electromagnetic radiation from the external control. The external device included a transmitting coil which was driven by an external pulse generator. If the external device was set for a faster rate than the intrinsic rate of the pacer, the former captured the pacer and drove it at the set rate of the external device. The induced voltage pulses in the coil of the implanted pacer affected a biasing circuit and caused the pulse generator of the pacer to pulse earlier than was the case when it was controlled exclusively by its own timing circuit.

Heretofore there has been no way to increase the rate of an implanted demand or standby pacer without sacrificing the demand or standby features. The prior art type of control for increasing the rate of a fixed rate pacer increased the rate at all times. Thus, competition developed when the heart interjected one or more natural beats. This is uncomfortable to the patient and has some adverse physiological effects which are well known.

An object of the present invention is to provide a rate control device which may be implanted in the body or located externally of the body to change the intrinsic rate of an implanted demand or standby cardiac pacer.

A further object is to provide a remote rate control which is inhibited for a predetermined period of time following occurrence of a natural heartbeat so that there will be no competition between remotely induced artificial stimuli and natural stimuli.

A still further object is to provide a remote pacer control which permits hysteresis or delay following a natural beat so that the heart may operate through a range of rates below the high set rate before the heart is artificially stimulated by the remote device.

Briefly stated, one embodiment of the invention requires that the implantable pacer be modified so that it radiates an electromagnet pulse for every natural heartbeat and every pacer stimulated beat. The new remote rate control also radiates control pulses to the pacer to make the pacer follow the rate set by the remote control. The remote rate control device has a coil which receives pulses from the pacer and produces corresponding signals which cause the remote pulse generator to be inhibited for a predetermined period after occurrence of a heartbeat. The delay or hysteresis period may be held constant or be caused to vary in proportion to the rate setting of the remote control.

How the above stated general objects and other more specific objects are achieved will appear from time to time throughout the course of ensuing more detailed description of embodiments of the invention taken in conjunction with the drawings. In this description and in the claims the term standby pacer will be used interchangeably with and equivalent to demand pacer since the invention is applicable to both regardless of nomenclature.

DESCRIPTION OF THE DRAWINGS

FIG. 3 is a schematic diagram of an alternative embodiment of an external control for an implanted standby pacer;

FIG. 4 shows some waveforms in respect to time relative to a conventional standby pacer; and FIG. 5 shows some waveforms with respect to time relative to a standby pacer that is controlled by the new control device.

DESCRIPTION OF A PREFERRED EMBODIMENT

Figure 1:
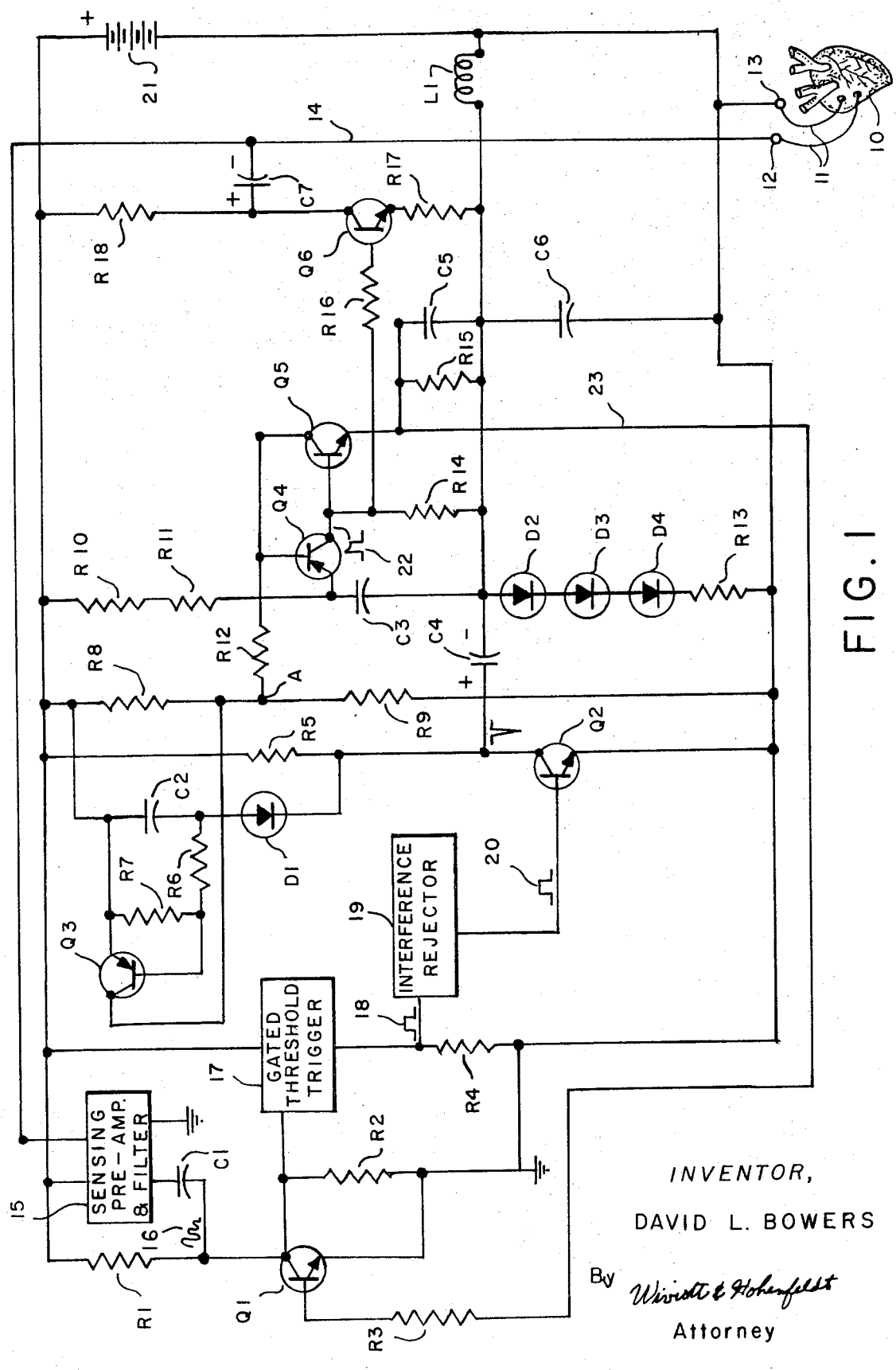
FIG. 1 is a circuit diagram of an implantable standby type cardiac pacer incorporating the invention.

FIG. shows a standby pacer which has been modified for having its pacing rate controlled externally. In this figure one may see a diagram of a heart 10 which is connected by means of a pair of insulated leads 11 to the output terminals 12 and 13 of the standby pacer. Leads 11 serve the dual purpose of delivering artificial pacing pulses to the heart and detecting the presence of natural heart signals. Except for leads 11, the circuit elements shown in this figure are usually encapsulated in a solid epoxy resin and coated with body tolerant material, such as silicone rubber.

This type of pacer is adapted for delivering stimulating pulses to the heart only if natural beats are delayed or missed. Hence, means are provided for sensing the occurrence of natural beats and inhibiting the artificial pulse generator. A line 14 therefore runs from heart terminal 12 to a sensing preamplifier and filter 15 which is shown in block form at the front end of the pacer. There will be an explanation later on how the natural heart signals which are delivered to preamplifier 15 from the heart over conductor 14 are Processed to control a pulse generator comprising transistors Q4 and Q5.

Preamplifier and filter 15 constitute a heart signal detecting means. The filter has a band-pass of between 20 and 40 Hz. Each natural or artificially induced heart signal is rich in fundamental frequencies within this band-pass region. When a heart signal or R-wave is received, filter 15 is shocked and produces a ringing output signal of the form marked 16 on the output side of the filter. An alternating ringing signal 16 is produced by the filter regardless of whether the incoming R-wave signal from the heart is positive or negative.

The ringing signal is, a-c coupled through a capacitor C1 to a gated threshold trigger 17 which is shown in block form. The trigger is biased by a voltage divider comprising resistors R1 and R2. For any positive swing of ringing signal 16, there is one output pulse such as 18 delivered from the trigger 17. The output pulse appears at the top of resistor R4 every time a natural heartwave occurs. Trigger 17 is inhibited and produces no output signal when an artificial stimulating or pacing pulse is being delivered to the heart. Inhibition or gating of the signals is accomplished with a transistor gate Q1, as will be described later.

Pulses 18 occurring at the rate at which R-waves are being detected on the heart are delivered to an interference rejector 19 Which is shown in block form. For present purposes the details Of interference rejector 19 are not pertinent. It is sufficient to be aware that rejector 19 is similar to a low pass repetition rate filter which yields an output signal for input pulses associated With normal heart activity and excludes high repetition rate signals associated with certain types of interference such as electric razors, electric drills and automobile ignition systems. The rejector is not frequency responsive but is pulse rate responsive. For present purposes it is sufficient to know that input pulses 18 Of enough amplitude and at a low enough rate will produce an output pulse 20.

Output pulses 20 are delivered to the base of a transistor Q2 which conducts for the duration of every pulse 20. When transistor Q2 conducts, it resets an hysteresis circuit which will be described. Before discussing the hysteresis circuit, the artificial pacing pulse timing circuit and the circuit which it drives will be discussed. Attention is invited to the right side of FIG. 1 where one may see a heart coupling capacitor C7. This capacitor is connected to the positive side of batteries 21 through a high value charging resistor R18. The time constant of R18 and C7 is such that the capacitor will charge to a sufficient voltage level for stimulating the heart during the interval between beats. C7 is charged from batteries 21 through a series circuit including R18, C7, conductor 14, the heart 10 and back to the negative side of batteries 21. When the heart demands an artificial beat, transistor Q6 is rendered conductive so as to quickly discharge capacitor C7 through the heart to thereby stimulate it. The discharge path originates with the positive side of C7 and continues through the series path including Q6, R17, a coil L1, the heart 10 and back to the negative side of C7 on conductor 14. The slow charge rate of C7 results in a current that is insufficient to stimulate the heart. When switching transistor Q6 is turned on, however, comparatively heavy current flows from capacitor C7 and the heart is stimulated. The stimulating pulse width is about 1 to 2 milliseconds. Each time a stimulating pulse is delivered, coil L1 transmits an electromagnetic pulse to outside of the patient's body. C6 is used to attenuate high frequency interference signals.

Switching transistor Q6 is controlled by a timing pulse generator including transistors Q4 and Q5. The timing pulse generator has a timing circuit including resistors R10 and R11, C3, diodes D2–D4, and resistor R13. The diodes and R13 are also paralleled by coil L1. The junction point of R13 and L1 is connected to the negative side of the batteries 21. If no artificial stimulating pulses are demanded by the heart, C3 will charge to a predetermined voltage level near battery voltage and will ordinarily remain at that level.

One side of C3 is connected to the emitter of a transistor Q4 whose base connects through resistor R12 to point A, which is in a voltage divider including resistors R8 and R9. The ratio of these resistors is such that point A is held more positive than the top of capacitor C3 in which case the emitter-base circuit Q4 is not forward biased. However, for reasons which will be explained, when a natural heartbeat is missed or delayed for a specified period of time, point A will go more negative in which case capacitor C3 begins discharging through the emitter-base circuit of Q4 and turns the latter on. This also renders the emitter-to-collector circuit of transistor Q4 conductive and causes a pulse 22 to appear on its collector. The pulse duration is about 2 milliseconds which is desirable for stimulating the heart. The latching voltage keeping this multivibrator circuit in conduction appears across resistor R12 and is additive to the bias voltage across resistor R8.

When Q4 conducts, a voltage appears at the top of its collector resistor R14 and this voltage is applied through pulse width control resistor R16 to the base of Q which causes the heart coupling capacitor C7 to discharge and stimulate the heart. When the stimulus pulse terminates, the timing capacitor C3 recharges and therefore repeats the timing cycle if no natural beat appears within a predetermined time period.

When Q4 conducts Q5 also conducts and the potential appearing on its emitter is applied by way of a conductor 23 and a resistor R3 to the base of the inhibiting transistor Q1 at the far left of the drawing. When Q1 conducts, the input of threshold trigger 17 is pulled down to ground potential in which case it cannot conduct and, hence does not sense nor respond to artificial pacing signals.

A filter network including capacitor C5 and resistor R15 prevent the emitter of transistor Q5 from floating above ground potential while at the same time providing emitter impedance during the conductive state of Q5.

Attention is now invited to the manner in which point A is divider R8 and R9 has its voltage state selectively changed in accordance with whether or not an artificial pacing pulse is demanded by the heart. This is accomplished by an hysteresis circuit which includes capacitor C2. The charging circuit for C2 is a series circuit starting at the positive side of battery 21 and continuing through diode D1 and transistor Q2 to the negative side of the battery. Diode D1 is forward biased when C2 is charging. As explained earlier, whenever a natural heartbeat occurs, Q2 conducts in which case capacitor C2 is charged rapidly. C2 is connected across the emitter and base circuit of a transistor Q3 in the hysteresis circuit. The collector of Q3 is connected to point A and its emitter is effectively connected to the top of R8 or positive side of battery 21 so that when Q3 is conducting R8 is effectively short circuited and has minimum voltage drop across it which is the emitter to collector saturation voltage of Q3. Point A is then near positive battery voltage. For a period after a natural heartbeat, C2 keeps Q3 forward biased by reason of a voltage drop occurring across discharge resistors R6 and R7. C2 must discharge through R6, R7 and the emitter of Q3 since D1 is now reverse biased. As long as Q3 conducts, point A is held relatively positive since there is minimum voltage drop across R8. If C2 discharges through R6 and R7 to a certain low level, hysteresis transistor Q3 will turn off, causing voltage to appear across R8 and a drop in the potential at point A. This will permit timing capacitor C3 to forward bias Q4 and pulse the heart as described heretofore. As long as Q3 remains nonconductive, timing capacitor C3 will repetitively charge and discharge with a period which is shorter than the discharge period of C2 in the hysteresis circuit. The result is that after the initial delay caused by the hysteresis circuit, Q4 will be rendered conductive at a higher rate than the rate of the hysteresis circuit.

The normal hysteresis mode of operation of the implanted pacer may be visualized by referring to FIG. 4 which shows the time relationship of actual and artificial heart stimuli waveforms. Assume, for instance, that a succession of electrocardiograph waves having R-wave peaks 25 have been occurring naturally. Assume also that maintenance of desired natural rhythm would require existence of a natural signal at 26, but that this natural signal does not occur or is delayed for an unacceptable period. The hysteresis period will then elapse after which an artificial stimulating pulse 27 will be applied to the heart. The hysteresis period is indicated as being one second, corresponding with a 60 pulses per minute rate. However, pacers with a longer or shorter hysteresis period are available on order depending on what the physician specifies as being the desired minimum heart rate for the patient.

In FIG. 4 one may see that unless a natural heartwave occurs within a predetermined period of time after artificial pulse 27, another artificial pulse 28 will be supplied within a period that is shorter than the hysteresis period. In this case, the second and ensuing artificial pulses are indicated as being supplied within 0.857 seconds which corresponds with 70 pulses per minute. Whenever a natural heartwave occurs, the hysteresis circuit is reset and an artificial pulse will not be supplied until expiration of the hysteresis period. Thus, the heart may drop down to a low rate before an artificial pulse is supplied and thereafter any required artificial pulses are delivered on a shorter period or higher rate.

The means for transmitting a signal indicative of the occurrence of a natural heartwave from the implanted pacer to outside of the body will now be described in reference to FIG. 1. For this purpose, the pacer is provided with a capacitor C4 which charges in a time that is short compared with the time between natural or artificially stimulated heartbeats. The charging path for C4 starts at the positive terminal of the battery and includes a series circuit comprising R5, C4, coil L1, and back to the negative terminal of the batteries 21. The charging time constant is short compared with the time between either natural or artificially stimulated beats. As explained earlier, whenever a natural beat occurs, transistor Q2 conducts to reset the hysteresis circuit. At the same time capacitor C4 discharges through transistor Q2 and coil L1 which are all in a series circuit. The discharge wave form at the coil L1 radiates an electromagnetic pulse to the outside of the patient corresponding with every natural heart signal. If there is no natural beat, Q2 does not conduct and coil L1 does not transmit unless an artificial pulse occurs which will produce a signal across L1 as previously explained.

The purpose of the new external rate control which will be described is to increase the rate of the implanted pacer so that the heart beats at rate different than that dictated by either the hysteresis circuit or the intrinsic pulse rate of the pulse timing generator which includes transistors Q4 and Q5. It will appear subsequently that the rate of the implanted pacer is charged by inducing electromagnetic pulses into coil L1 from the external control unit. Any time the external rate control is set higher than the intrinsic rate of the implanted pacer, the external control will capture or dominate the internal unit.

When coil L1 receives electromagnetic pulses from the external rate control, a voltage is developed across the coil by transformer action. The same voltage is developed across series connected diodes D2 – D4 and R13 which are effectively connected across coil L1. Thus, a received pulse causes the anode of diode D2 to rise in potential and this potential is additive to the potential on capacitor C3 which is in series with the diodes. This added voltage is sufficient to forward bias the emitter of timing pulse generator transistor Q4 so as to render this transistor conductive earlier than would have been the case if the voltage on C3 were relied upon exclusively to forward bias Q4. The added voltage is sufficient to forward bias Q4 if C3 is fully charged even though point A is relatively positive due to transistor Q3 of the hysteresis circuit still causing R8 to be bypassed. Under any circumstances, then, Q4 may be rendered conductive by the voltage pulses produced across coil L1 and the implanted unit will be caused to stimulate the heart at whatever rate the external control is set for.

Figure 2:
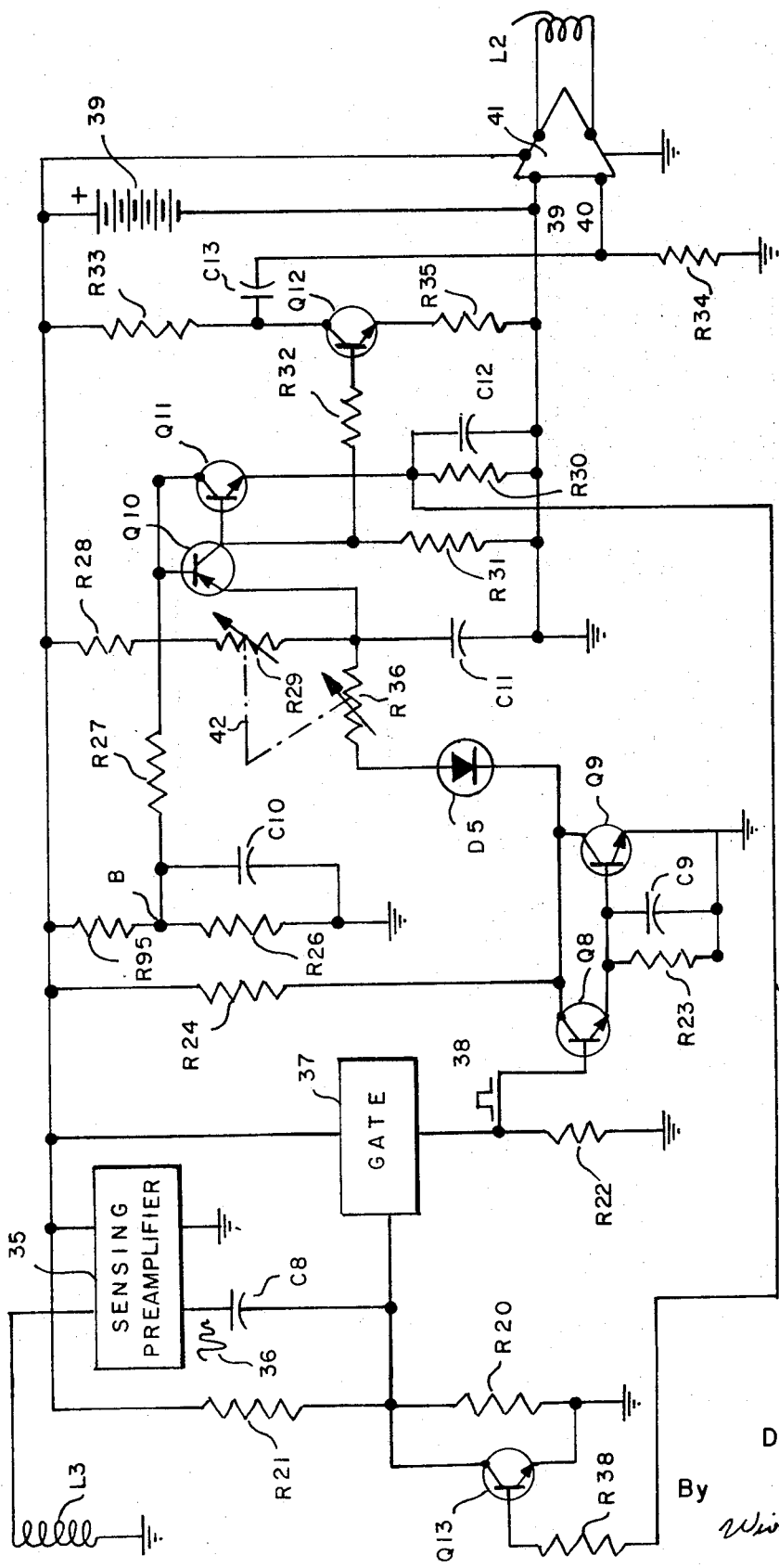
FIG. 2 is a circuit diagram for one type of standby pacer remote rate control.

One embodiment of an external rate control is depicted in FIG. 2. This rate control has its own hysteresis, that is, it not only dominates the intrinsic pulse rate of the implanted pacer but it also retains an independent hysteresis feature even though it is operating at a higher set rate. The mode of operation may be understood by referring to FIG. 5 which shows the time relationship between natural and artificial pulses when the external control unit is applied to the implanted pacer. Assume first that the intrinsic pulse rate of the implanted pacer is seventy pulses per minute (p.p.m.), for example, and that it is desired to step up its rate to ninety pulses per minute, for instance by use of the external control. Assume that a natural R-wave 30 has occurred as indicated. This will be followed by an hysteresis period, set by the external control unit, which is 0.750 seconds in this example, corresponding with an artificially induced pulse rate of eighty pulses per minute. At the end of the hysteresis period, an artificial pulse 31 is induced. If this pulse is not followed by a natural heart wave within a predetermined time, the next artificial pulse 32 will occur in 0.667 seconds which corresponds with ninety pulses or heartbeats per minute. Ensuing pulses will occur at this short period until the next natural heartbeat occurs at which time the hysteresis circuit is reset. In some applications it is desirable to have the hysteresis period equal to the artificial pulse period. To recapitulate, the external control stimulates the heart at a selected rate which is different than but usually selected higher than the intrinsic rate of the implanted pacer and the external unit also permits the heart rate to drop below the high rate of the external control but usually not less than the hysteresis rate of the implanted pacer before any artificial pulse is induced from outside the patient.

The external control shown in FIG. 2 has some of the characteristics of the standby implanted pacer which has been described above. A notable exception is that the external unit delivers control pulses to a transmitting coil L2 which may be placed on the body in proximity with the implanted pacer. The input of the external unit also has a pulse receiving coil L3. Coils L2 and L3 may be flat coils with the detecting coil L3 inside and concentric with the transmitting coil L2 and they may be included in a single package. The detecting coil L3 preferably has a ferrite core for improving the flux density that results from transmission of electromagnetic pulses from coil L1 in the implanted pacer due to either the discharge of capacitor C4 when a natural heartbeat occurs or during the delivery of an internal stimulus pulse.

In the external control shown in FIG. 2, the detector which receives pulses from the internal pacer includes coil L3 and a sensing preamplifier 35. For every detected pulse, there is a ringing output pulse 36 which is a-c coupled through a capacitor C8 to a gate 37. The gate is biased by a voltage divider comprising resistors R20 and R21. When the gate 37 is gated with an input pulse 36 it produces an output pulse 38 at the top of R22. These pulses 38 are supplied to the bases of the Darlington transistor pair Q8 and Q9, turning them on. The base biasing resistor R23 for transistor Q9 is in parallel with a filter capacitor C9. The collectors of the two transistors are connected together and to a common collector resistor R24. Thus, each time implanted pacer coil L1 transmits a pulse that corresponds with either the occurrence of a natural heart wave or a stimulated internally generated heart wave, external coil L3 receives the transmitted signal and transistors Q8 and Q9 conduct. It will be explained subsequently that Q8 and Q9 do not conduct due to gate 37 being inhibited when the external control generates a pulse which is transmitted to the implanted pacer.

The external control pulse timing circuit in FIG. 2 includes transistors Q10 and Q11. The base of Q10 and the collector of Q11 are connected to a point B of a voltage divider circuit comprising resistors R25 and R26. R26 is shunted by a filter capacitor C10. The conductor between resistors Q10 and Q11 and point B includes a resistor R27 which performs the same function as R12 in FIG. 1.

The pulse period for the external control is established with a timing circuit including a fixed resistor R28 in series with an adjustable resistor R29 and a timing capacitor C11. When the external control in on, C11 charges from batteries 39 through resistors R29 and R28 and back to the negative side of the battery. When C11 has charged to a voltage which is in excess of the sum of the forward biasing voltage at point B and the diode drop of the emitter-base circuit of Q10, the latter will become forward biased and will conduct through its emitter to collector path and produce a pulse which appears on the top of R31. The forward biased transistor Q11 operates regeneratively with Q10 and turns on the latter very hard. Q11 has an emitter resistor R30 in parallel with a filter capacitor C12.

Square wave pulses which appear on collector resistor R31 of transistor Q10 are furnished through a resistor R32 to the base of driving transistor Q12. The value of R32 determines the width of the pulse applied to Q12. A capacitor C13 is connected for being charged comparatively slowly through a resistor R33 which connects directly to battery 39. The charging path for C13 is completed through a resistor 34 to the negative side of battery 39. C13 charges slowly to near battery voltage between pulses and is discharged rapidly when Q12 is rendered conductive. The discharge path of C13 is through Q12, its emitter resistor R35, and the input terminals 39 and 40 of a driving amplifier 41 which is shunted by a resistor R34. The output from driving amplifier 41 consists of pulses which are delivered to transmitter coil L2. These pulses are electromagnetically coupled to coil L1 in the implanted unit.

When a control pulse is transmitted from coil L2 to the implanted pacer, the latter will deliver a stimulating pulse to the heart. This will result in an electromagnetic pulse being radiated by implanted coil L1 which pulse will be sensed by external coil L3. If this fedback signal were processed in a manner that would cause external transistors Q8 and Q9 to conduct, the timing of the external pulse generator would be affected by reason of C11 being wholly or partially discharged. Hence, when the external control produces a pulse, gate 37 is inhibited. This is done by applying the pulse signal by way of conductor 28 and R38 to the base of inhibiting transistor Q13 to make it conduct for the pulse duration. Conduction of Q13 effectively grounds the input of gate 37 so that it will not pass a signal which would make Q8 and Q9 conduct. These transistors should conduct only when implanted coil L1 radiates a signal corresponding with natural heart signals or internally artificially generated heart stimulating signals.

Going back to the pulse timing circuit, it will be seen that adjustable timing resistor R29 is ganged to another adjustable resistor R36 which is connected to C11 and as a diode D5 in its circuit, the cathode of which connects to the collectors of transistors Q8 and Q9. As explained, when receiver coil L3 detects a pulse from the implanted pacer, Q8 and Q9 are rendered conductive in which case C11 discharges before its voltage reaches the level which would allow forward biasing of Q10 and the production of a driving pulse. The discharge path for this anticipatory discharge of C11 is from the capacitor through adjustable R36, diode D5 and the collector-to-emitter paths of Q8 and Q9.

The voltage that remains on C11 when it is prematurely discharged depends on the set resistance value of R36. If R36 is set to zero ohms, only the impedances of D5, Q8 and Q9 will limit current flow in which case C11 will discharge substantially completely. In this case a longer time will be required to recharge C11 and there will be some hysteresis or delay before Q10 will conduct following detection of a pulse transmitted from the implanted pacer. On the other hand, if R36 is set with a comparatively high ohmic value, C11 will have a greater residual voltage on it after conduction of transistors Q8 and Q9 and less time will be required to recharge the capacitor C11 after this event. This means that Q10 will conduct in a shorter time after a pulse which is transmitted from the implanted pacer is detected and a control pulse will be transmitted sooner from coil L2 to implanted coil L1, thus making the implanted pacer provide a stimulating pulse earlier.

Variable resistors R29 and R36 are preferably ganged as indicated by the broken line 42 in order that hysteresis will be proportional to the high pulse rates or some programable function.

Many different operating modes are attainable with the combination of the standby pacer and the external rate control. The physician may select the desired mode depending on the type of control he wants for the treatment or testing of the particular patient. Generally, mode selection will involve merely turning knobs on the external control to adjust the timing resistor such as R29 and the hysteresis resistor R36 to get the desired external control pulse rate and hysteresis rate.

The most common mode is where the internal pacer has a predetermined intrinsic pulse rate and a fixed hysteresis rate or period. The external control is set to a high pulse rate above that of the internal pacer and above the external hysteresis rate. The external control then drives the internal pacer at the high set pacing rate of the external control. If a natural beat occurs, the hysteresis in the external control is reset and, after expiration of the hysteresis period, an external control pacing pulse will be delivered. Unless another natural pulse occurs, the external control will continue to generate pacing pulses at its high set rate. Internal pacer hysteresis will have no effect when the external hysteresis, the internal pace rate and the set external pace rate are all faster than the internal hysteresis rate.

Another mode results from setting the external control pace pulse rate so that the internal pacing pulse rate falls between this setting and the hysteresis rate of the external control. All rates are, of course, above the internal pacer hysteresis rate. Assume the external control is delivering pulses at its high set rate. Assume that a natural heart wave then occurs. This will reset the internal and external hysteresis periods. But the external hysteresis period is shorter than the internal so the external control will deliver one heart stimulating control pulse. If no natural heartwave occurs soon thereafter, the external control will provide ensuing stimulating pulses at its high set rate. Therefore, the internal pacer rate is overridden by the higher external rate setting.

Another mode involves setting the external high rate below the internal pacer high rate and setting the external hysteresis period shorter than the internal pacer hysteresis period. In effect, this mode results in relating the external control's hysteresis rate to the pacer's intrinsic pulse rate. In this mode, if the internal pacer is stimulating at its high intrinsic rate and a natural heart wave occurs there will be a signal radiated from internal coil L1. This will reset the external hysteresis period. At the end of this period, which is shorter than the internal hysteresis period, if no natural beat occurs the external control will supply one stimulating pulse and then the internal pacer will supply ensuing pulses at its intrinsic pace pulse rate. In this case the latter rate is higher than the pacing rate of the external control.

In another mode the internal hysteresis period is set shorter than the external hysteresis period and the internal pace rate is higher than the external. Occurrence of a natural heart wave will then set the shorter internal hysteresis period and upon its expiration, the internal pacer will supply the next and ensuing stimulating pulses at its high pacing rate. The external control will remain inhibited due to its hysteresis period never having a chance to expire. In this mode the external control is not redundant since it is always ready to provide an artificial stimulating pulse and would be used for emergency pacing until the internal pacer can be replaced such as when its battery may be running down and occasionally missing a beat.

If the external control's pacing rate and hysteresis rate are set below the hysteresis and pacing rate of the internal pacer, the latter will remain inhibited but may be used as a standby to a standby implanted pacer.

To recapitulate operation of the external control shown in FIG. 2, R29 is set for producing pulse rates different than but usually in excess of the pulse rates of the implanted pacer. The range is usually from above 70 pulses per minute to 140 pulses per minute depending on the physician's desire and the paient's needs. The high rate pulses are transmitted from external control coil L2 to coil L1 in the implanted pacer by means of which the rate of the implanted pacer is captured or dominated. Whenever a natural or an internally stimulated beat occurs, a pulse is detected by input coil L3 and, after suitable processing, causes C11 to be prematurely discharged in which case the external hysteresis circuit is reset. If a natural beat does not occur at the end of the external hysteresis period, the external control will provide a first stimulating pulse and then a series of higher rate pulses as required.

FIG. 3 is an alternative form of external rate control. Parts in this figure which are similar to those in preceding figures are given the same reference numerals. In this arrangement a regular external standby pacer 45 is adapted to serve as an external rate control for an implanted spacer 46. The traditional use of an external standby pacer is for temporarily pacing the heart pending installation of an implanted unit or as a safety measure for patients with a cardiac problem. The external pacer usually connects to the heart by means of a conductive catheter, not shown, which leads from the output terminals 47 and 48 through a blood vessel to the heart. Such pacer usually has a rate control 49, a standby or fixed rate mode control 50 and a current control 51. This type of pacer operates similarly to a standby implanted pacer in the respect that it provides an artificial stimulating pulse whenever the natural heartbeat is missed or delayed for a predetermined period of time. In this embodiment, the leads 52 and 53 which would normally run to the heart to supply artificial pulses and to pick up natural waves, are bridged by a resistor R40 which is part of a voltage divider that includes R41.

Coil L3, which detects transmitted pulses from implanted coil L1 upon occurrence of a natural heart signal or internal pace pulses drives an amplifier 54. Output signals from amplifier 54 produce a voltage across R40 in a voltage divider R40 and R41 which is similar in magnitude to a signal that would be detected on the heart if the unit were used as a pacer instead of an external control. Pace signals from the external standby control appear across R40 and trigger a coil driver 55 which is comparable in function to driver transistors Q6 and Q12 in FIGS. 1 and 2, respectively. In other words, each time a signal from L1 is detected, it is sensed by the external pacer unit 45 which is thereby inhibited. If no signal is detected in receiver coil L3, the external unit 45 provides a signal over its leads 53 and 52 to coil driver 55 and coil L2 which transmits a large amplitude electromagnetic pulse to the implanted pacer coil L1, causing the pacer to provide an artificial stimulating pulse to the heart. In reality, then, amplifier 54 serves as a detector for internally generated signals that inhibits the external control 45 from producing pacer triggering signals to coil driver 55 if there are natural heart waves or internal pace pulses at a rate higher than the set pace rate or hysteresis rate of the external control.

The external rate controls shown in both FIGS. 2 and 3 have no effect on the implanted pacer if the pulse rate of the external rate controls are set below the intrinsic and the hysteresis rate of the implanted pacer.

For the sake of illustrating the principles of the invention the above description assumes that the remote rate control is situated external to the body and that the standby pacer power supply is implanted in body tissue and connected to the heart with relatively long conductors or an intravascular conductive catheter. However, the new rate control may also be adapted for implantation in body tissue remote from the pacer. It is only necessary to seal the control against permeation by body fluids and to provide suitable means for varying the pulse period of the control which means can be operated from outside of the body. For example, instead of using a variable potentiometer or resistor such as R29 to change the pulse period, a resistor and magnetic reed switch network could be used. The reed switches could be operated selectively by means of an external magnet so as to change the charging or discharging time of the timing capacitor C11 and, hence, the pulse period. An adjustable potentiometer that is operable with a needle that penetrates the tissue can also be used to change pulse timing. Solid state memory systems controlled by remotely operable switches or by induction may also be incorporated in the implanted remote rate control. Various types of capacitor switching may be used too.

Advances in solid state technology and in power supplies are expected to permit such size reduction of standby pacers that it will soon be practical to mount a pacer directly on the heart and to connect it to the heart without using flexible leads. Long life power sources and durable solid state circuitry is expected to result in infrequent replacement and infrequent need to gain access to the pacer. On the other hand, the optimum pacing rate for a patient is likely to change over such a long time. In such case, the new remote rate control can be implanted beneath the skin surface in a readily accessible place remote from the pacer on the heart and the patient's heart rate can be changed at will without surgery. The remote rate control would then be replaceable, when required, by a superficial surgical procedure using local anesthesia. Replacement of conductors leading to the heart would be obviated.

In summary, two different types of remote rate controls for implanted standby cardiac pacers have been described. Each requires that the implanted pacer be modified to transmit an electromagnetic radiation pulse in response to the occurrence of a natural or artificially stimulated heartbeat. If the signal is one which corresponds with a natural heartbeat, the remote control is inhibited during a hysteresis period after which an artificial stimulating pulse is supplied to the heart. The heart is always stimulated at a rate determined by the set rate of the remote control assuming the control rate is higher than the internal pace rate. The hysteresis features of the internal standby pacer and the remote control are nonconflicting. Competition between natural and artificial heart stimuli is avoided.

Although embodiments of the invention have been described in considerable detail, such description is intended to be illustrative rather than limiting, for the invention may be variously embodied and it is to be limited only by interpretation of the claims which follow.

I claim:

1. A rate control for remote control of the pacing pulse rate of a heart pacer that cooperates with the remote control, which pacer is characterized by having an intrinsic pulse period and by radiating a signal from it each time a natural heart stimulus occurs or an artificially generated heart stimulus caused by it occurs and by having its pulse period controlled by control signals which are radiated into it from the remote rate control, said remote rate control comprising:

a. a pulse generator for producing control pulse signals with a predetermined period between them which is different than the intrinsic pacing pulse period of said pacer,
 b. a first pulse timing means for controlling the pulse period of the control pulse generator,
 c. means for transmitting to said pacer signals corresponding with said control pulse signals,
 d. means for detecting in said remote rate control signals that are received from said pacer which detected signals correspond with occurrence of either a natural or an artificial heart stimulus signal, and
 e. means for resetting the pulse timing means of the remote rate control to begin a predetermined time period in response to occurrence of a detected signal from said cooperating pacer corresponding with either a natural heart signal or an artificially generated stimulus signal, said timing means then causing said control pulse generator to produce a control pulse if neither of said signals is detected before the end of said reset time interval.

2. The invention set forth in claim 1 including:
   a. hysteresis means for resetting said pulse timing means to produce a timing period which is different than said predetermined period in response to occurrence of a detected signal from said pacer corresponding with said either natural or artificial heart stimulus signals, said control pulse generator being controlled by said timing means to produce a control signal in correspondence with expiration of said different timing period to cause said cooperating pacer to artificially stimulate the heart, said timing means then operating to produce control signals to cause said pacer to artificially stimulate the heart in correspondence with said predetermined period until another signal from said pacer is detected.

3. A rate control for remote control of the pacing pulse rate of a first standby heart pacer that cooperates with the remote control, which pacer is characterized by having an intrinsic pulse period and by radiating a signal each time a natural heart stimulus occurs or an artificially stimulated heartbeat caused by it occurs and by having its pulse rate dominated to correspond with the rate at which control signals are radiated into it, said remote rate control comprising:
   a. a second standby pacer which is adapted to remotely control said first standby pacer which is implantable in the body,
   b. said second standby pacer having output terminals and a pulse generator for selectively supplying control pulses to the output terminals at a selected rate which is different than the intrinsic pulse rate of said first implantable standby pacer, said second pacer including timing means controlling its pulse generator to produce pulses at said selected rate and including means for inhibiting production of a pulse in response to occurrence of a signal across said output terminals corresponding with a signal from said first heart pacer,
   c. means connected with said output terminals of said second standby pacer for receiving pulse signals which correspond with signals that are transmitted through body tissue from said first implantable standby pacer and correspond with occurrence of a natural or stimulated heartbeat,
   d. means for delivering signals corresponding with said received signals to said second standby pacer output terminals to thereby actuate said inhibiting means to inhibit said second standby pacer until expiration of its pulse period, said received signals corresponding with either a natural heart stimulus or an artificial stimulus caused by said first pacer, and
   e. signal transmitting means associated with said second standby pacer for receiving signals from said second standby pacer when it is not inhibited and for transmitting corresponding control signals to said first implantable pacer so as to control its pacing pulse period in synchronism with the period of the second standby pacer.

4. The invention set forth in claim 3 wherein:
   a. a resistor voltage divider means a part of which is connected across said second pacer output terminals,
   b. said signal receiving means includes a receiving coil,
   c. an amplifier having its input connected to the receiving coil and its output connected to another part of said resistor means which is connected to said first part to produce a voltage across said first part of said resistor means when there is a detected signal, said voltage inhibiting said second pacer,
   d. said signal transmitting means including a pulse amplifying means and a transmitting coil,
   e. said pulse amplifying means being connected to said terminals of said second pacer whereby to receive pulses from said second pacer when it is not inhibited and to drive said transmitting means for controlling said implantable pacer.

5. An implantable heart pacer that is adapted for having its intrinsic heart pacing pulse rate altered in response to receipt of signals at the selected pulse rate of a remotely situated control, said pacer comprising:
   a. a pacing pulse generator means that produces heart pacing pulses at an intrinsic rate and means for sensing a natural heart signal and means responsive to said sensing means for inhibiting said pacing pulse generator from producing a pacing pulse for a predetermined period upon occurrence of a natural heart signal,
   b. timing means controlling the pacing pulse generator period,
   c. means in said implantable pacer for receiving control signals radiated from a remote rate control means at a rate that is different than the intrinsic pacer pulse rate and for radiating signals to said remote control, said timing means including means responding to said received signals by altering the period between intrinsic pace pulses and changing the rate of said pacing pulse generator to correspond with the pulse rate of said remote control, and
   d. means for producing a control signal in response to occurrence of either a natural heart signal or an artificial pacing signal and including means coupled thereto for radiating a remote control inhibiting signal outside of the implantable pacer in correspondence with said either signals.

6. The invention set forth in claim 5 wherein:
   a. said timing means associated with the pacing pulse generator of the pacer includes timing resistor means and a timing capacitor connected serially to each other, said timing capacitor being connected to said pulse generator and the voltage on said timing capacitor determining the time when said pacing pulse generator will pulse,
   b. said electromagnetic means comprising a coil connected with said timing capacitor and across which is developed a voltage when a signal is received which voltage is additive to that on the timing capacitor, whereby said pacing pulse generator produces a pulse at a time before expiration of its intrinsic interpulse interval.

7. The invention set forth in claim 5 including:
   a. a pulse capacitor connected to said radiating means which is a coil means, and a charging circuit for said pulse capacitor, b. switching means having a control terminal and load terminals the latter of which are connected in series with said pulse capacitor and said coil means, c. the control terminal of said switching means being connected to receive last named control signals whereby to establish conduction across its load terminals so as to discharge said capacitor through said coil, whereupon said coil radiates a heart stimulus indicating signal to said remote rate control.

8. A remote rate control for controlling the artificial heart stimulus pulse rate of an implantable pacer which is characterized by having an intrinsic pulse rate and by it radiating a signal to the outside of the body upon occurrence of each natural heart stimulus and each artificial stimulus pulse that is produced by the pacer, said pacer being adapted to have its pulse rate controlled in relation to the rate at which control signals are radiated into it, said remote rate control comprising:

a. pulse generating means, b. signal radiating means for radiating signals to said implantable pacer in correspondence with pulses from said pulse generating means, c. pulse timing means for controlling said pulse generating means to produce pulses with a certain interpulse period, d. detector means for detecting signals which are radiated from said implantable pacer in correspondence with occurrence of either a natural heart stimulus or an artificially generated stimulus of said pacer, and e. means responding to detection of either a natural heart stimulus or an artificial stimulus from said pacer by resetting said pulse timing means, f. said pulse timing means comprising a d-c source terminal and resistor means and capacitor means serially connected to each other and connected with said source terminal, a predetermined voltage on said capacitor resulting from charging it from said source terminal controlling said pulse generator to produce a pulse, and g. means connected with said capacitor means and responding to detection of either of said stimuli by reducing the voltage on said capacitor means to less than said predetermined voltage to thereby inhibit said remote pulse generator means for a second predetermined period.

9. The invention set forth in claim 8 including:

a. semiconductor switch means connected to said capacitor for being rendered conductive by a predetermined voltage on said capacitor to cause said pulse generator to produce a pulse and effect the delivery of a corresponding radiated signal, b. a bias voltage divider means connected to said semiconductor switch means and applying a bias voltage thereto, c. said means responding to said detection of either of said stimuli being switching means which respond by preventing the difference between the voltage on the capacitor and said bias voltage from exceeding the voltage which would render said semiconductor switch means conductive, whereby said pulse generator is inhibited from producing a pulse for a predetermined period following a detected signal.

* * * * *